United States Patent
Karrer et al.

(10) Patent No.: US 12,447,971 B2
(45) Date of Patent: Oct. 21, 2025

(54) METHOD AND CONTROL DEVICE FOR OPERATING A MOTOR VEHICLE

(71) Applicant: ZF Friedrichshafen AG, Friedrichshafen (DE)

(72) Inventors: Manuel Karrer, Deggenhausertal (DE); Peter Herter, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/746,640

(22) Filed: Jun. 18, 2024

(65) Prior Publication Data
US 2024/0425053 A1 Dec. 26, 2024

(30) Foreign Application Priority Data
Jun. 20, 2023 (DE) ................. 10 2023 205 730.1

(51) Int. Cl.
*B60W 30/188* (2012.01)
*B60W 10/04* (2006.01)
*B60W 10/10* (2012.01)

(52) U.S. Cl.
CPC .......... *B60W 30/188* (2013.01); *B60W 10/04* (2013.01); *B60W 10/10* (2013.01); *B60W 2510/101* (2013.01); *B60W 2510/104* (2013.01); *B60W 2510/105* (2013.01); *B60W 2520/04* (2013.01); *B60W 2520/10* (2013.01); *B60W 2540/12* (2013.01)

(58) Field of Classification Search
CPC .... B60W 30/188; B60W 10/04; B60W 10/10; B60W 2510/101; B60W 2520/04
See application file for complete search history.

(56) References Cited

U.S. PATENT DOCUMENTS

| | | | | |
|---|---|---|---|---|
| 8,954,215 B2 * | 2/2015 | Yamazaki | ............. | B60W 10/08 701/22 |
| 9,644,733 B2 * | 5/2017 | Gansohr | ............. | F16H 61/0202 |
| 2019/0308624 A1 * | 10/2019 | Borhan | ............... | B60W 30/165 |

FOREIGN PATENT DOCUMENTS

| | | | | |
|---|---|---|---|---|
| DE | 102005039758 A1 * | 3/2007 | ......... | F02D 41/1401 |
| DE | 102009052226 A1 * | 5/2011 | ......... | F02D 41/1497 |
| DE | 102019220401 A1 * | 6/2021 | | |
| DE | 10 2020 216 136 A1 | 6/2022 | | |
| KR | 20180028332 A * | 3/2018 | | |

OTHER PUBLICATIONS

German Patent Office, German Search Report issued in German Patent application No. 10 2023 205 730.1 (Jul. 12, 2024).

* cited by examiner

*Primary Examiner* — Sherry L Estremsky
(74) *Attorney, Agent, or Firm* — Finch & Maloney PLLC

(57) ABSTRACT

A method for operating a drivetrain of a motor vehicle is disclosed. The operation of assemblies of the motor vehicle is controlled and/or regulated by taking into account a loss torque of the drivetrain, such that when a defined first operating condition of the motor vehicle is fulfilled, then as a function of a torque of a drive aggregate (1) of the drivetrain, as a function of a drag torque of a transmission (3) of the drivetrain, and as a function of a first sum of known loss torques of the drivetrain, a second sum of the unknown loss torques of the drivetrain is determined. Thereafter, the operation of assemblies of the motor vehicle is controlled and/or regulated taking into account the first sum of the known loss torques and taking into account the second sum of the unknown loss torques.

14 Claims, 1 Drawing Sheet

METHOD AND CONTROL DEVICE FOR OPERATING A MOTOR VEHICLE

RELATED APPLICATIONS

This application claims the benefit of and right of priority under 35 U.S.C. § 119 to German Patent Application no. 10 2023 205 730.1, filed on 20 Jun. 2023, the contents of which are incorporated herein by reference in its entirety.

FIELD OF THE DISCLOSURE

The invention relates to a method for operating a motor vehicle. In addition, the invention relates to a control unit for operating a motor vehicle.

BACKGROUND

A drivetrain of a motor vehicle comprises a drive aggregate and a transmission. The transmission converts rotation speeds and torques and delivers a traction force from the drive aggregate to a drive output, namely, to driven wheels of the motor vehicle. In addition, the drivetrain of a motor vehicle can comprise a power take-off. A power take-off is also known as a PTO or Power Take Out. With such a power take-off, for example, pumps or the like connected on the motor side or even the transmission side can be operated. The operation of assemblies of the motor vehicle is controlled and/or regulated with the help of control units. Thus, a motor control unit controls and/or regulates the operation of the drive aggregate and a transmission control unit controls and/or regulates the operation of the transmission. It is already known to control and/or regulate the operation of assemblies of the motor vehicle, such as the transmission, taking into account a torque loss. In accordance with common practice, such torque losses have until now been determined empirically and stored in the control unit concerned. However, owing to tolerance differences the loss torques are not the same for structurally identical drivetrains. Consequently, the control and/or regulation of the operation of assemblies of the motor vehicle solely on the basis of empirically determined loss torques stored in a control unit can result in imprecision of the control and/or regulation of the operation of particular assemblies of the motor vehicle.

DE 10 2020 216 136 A1 discloses a method for determining at least one loss torque in a drivetrain, wherein the loss torque is established by at least one secondary consumer or power take-off in the drivetrain. To determine the loss torque, a drive torque of the drive aggregate is read in, determined as a drive input parameter, in particular a driving dynamic parameter of the motor vehicle, then an input torque of the transmission is determined as a function of the at least one drive input parameter, and the loss torque is determined from a torque difference between the drive input torque read in and the input torque.

SUMMARY

There is a need to operate assemblies of a motor vehicle, namely, to control and/or regulate their operation, still more accurately or precisely.

The purpose of the present invention is to provide a new type of method and control unit for operating a motor vehicle in order to control and/or regulate the operation of assemblies of a motor vehicle still more accurately or precisely.

This objective is achieved by a method for operating a motor vehicle in accordance with the present disclosure.

According to the invention, when a defined first operating condition of the motor vehicle is fulfilled, then as a function of a torque of a drive aggregate of the drivetrain, as a function of a drag torque of a transmission of the drivetrain and as a function of a first sum of known loss torques of the drivetrain stored by the control system, a second sum of unknown loss torques of the drivetrain is determined. Thereafter, the operation of assemblies of the motor vehicle is controlled and/or regulated, taking into account the first sum of the known loss torques and also taking into account the second sum of the unknown loss torques.

With the present invention, it is proposed that when the defined first operating condition of the motor vehicle is fulfilled, the sum of the unknown loss torques of the drivetrain is determined. This takes place by way of a torque balance on the basis of the torque of the drive aggregate, on the basis of the drag torque of the transmission and on the basis of the sum of the known loss torques, which latter are preferably determined empirically. As a function of these three torques known by the control system, when the defined first operating condition of the motor vehicle is fulfilled the sum of the unknown loss torques is determined, and this is taken into account or used in the control and/or regulation of the operation of assemblies of the motor vehicle. With the invention it is possible to operate assemblies of a motor vehicle, namely, to control and/or regulate them, even more accurately or precisely.

Preferably, the defined first operating condition of the motor vehicle is fulfilled when the motor vehicle is at a standstill and when the drive aggregate is running at its idling rotation speed, and in particular when in addition the transmission is in neutral or a gear is engaged in the transmission and, preferably, a brake pedal is also actuated. When this first operating condition is fulfilled, the torque balance for determining the second sum, namely, that of the unknown loss torques can be computed particularly advantageously.

Preferably, when the defined first operating condition of the motor vehicle is no longer fulfilled, the second sum of the unknown loss torques is stored and thereafter the operation of assemblies of the motor vehicle is controlled and/or regulated, taking into account the stored second sum. After the second sum of the unknown loss torques has been determined, the second sum is stored and thereafter forms the basis of the control and/or regulation of assemblies of the motor vehicle.

Preferably thereafter, a starting process and/or a gear engagement and/or a gearshift is/are controlled and/or regulated, taking into account the first sum of the known loss torques and also taking into account the second sum of the unknown loss torques.

Preferably, when after this, a defined second operating condition of the motor vehicle is again fulfilled, the second sum of the unknown loss torques determined is reduced in particular to a defined percentage and the reduced second sum is used for controlling and/or regulating assemblies of the motor vehicle. In particular, the second sum of the unknown loss torques determined is reduced to the defined percentage with a defined time gradient. The defined second operating condition of the motor vehicle is in particular fulfilled when a speed of the motor vehicle or an output rotation speed of the transmission is higher than a first threshold value and/or when a time interval after the determination of the second sum of the unknown loss torques is longer than a second threshold value. The second sum of the unknown loss torques is the more uncertain, the more time has gone by since the determination of the second sum.

The control unit according to the invention is also disclosed.

BRIEF DESCRIPTION OF THE DRAWINGS

Preferred further developments emerge from the subordinate claims and from the description that follows. Example embodiments of the invention, to which it is not limited, are explained in greater detail with reference to the drawing, which shows:

DETAILED DESCRIPTION

Figure 1:
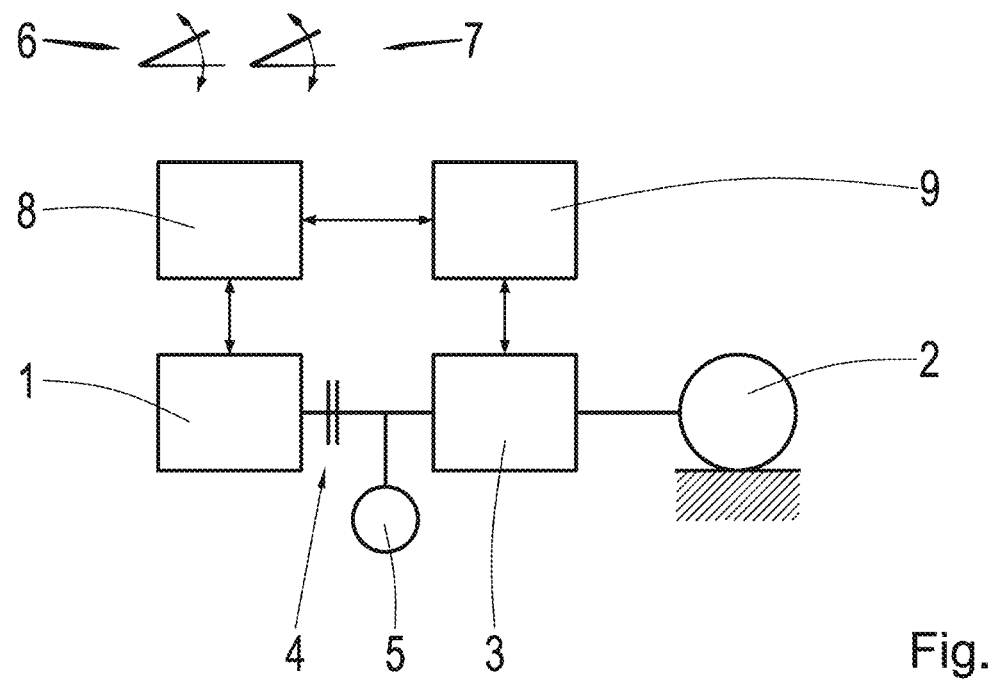
FIG. 1: A drivetrain scheme of a motor vehicle.

FIG. 1 shows a drivetrain scheme of a motor vehicle. The motor vehicle comprises a drive aggregate 1 and a transmission 3 connected between the drive aggregate 1 and a drive output 2. The drive output 2 is the driven wheels of the motor vehicle.

The transmission 3 converts rotation speeds and torques, and delivers the traction force provided by the drive aggregate 1 to the drive output 2.

FIG. 1 also shows a clutch 4 connected between the drive aggregate 1 and the transmission 3, as well as a power take-off 5. In FIG. 1 the power take-off is connected to an input of the transmission 3. The power take-off, which is also known as the PTO or Power Take Out, can for example be a pump, a cooling aggregate or the like.

In addition, FIG. 1 shows an accelerator pedal 6 and a brake pedal 7.

The operation of the drive aggregate 1 is controlled and/or regulated by a motor control unit 8 and the operation of the transmission 3 by a transmission control unit 9.

The motor control unit 8 exchanges data with the drive aggregate 1 and the transmission control unit 9 with the transmission 3. In addition, the motor control unit 8 and the transmission control unit 9 exchange data with one another.

To be able to operate assemblies of the motor vehicle with greater accuracy or precision, control parameters are stored in the control units 8, 9. These include a characteristic diagram stored in particular in the transmission control unit 9, with the help of which, as a function of a temperature of the transmission 3, a drag torque of the transmission 3 can be determined. Furthermore, in the motor control unit 8 and/or the transmission control unit 9 a first sum of known loss torques is stored, which have been determined for example empirically on the basis of tests.

Now, in order to be able to operate assemblies of the motor vehicle with particularly great accuracy and precision, namely to control and/or regulate them, when a defined first condition of the motor vehicle is fulfilled, then as a function of a current torque of the drive aggregate 1, as a function of a current drag torque of the transmission 3 and as a function of the first sum of the known loss torques of the drivetrain stored in the control units, a second sum of the unknown current torques of the drivetrain is determined.

After determining the second sum of unknown loss torques of the drivetrain, the operation of assemblies of the motor vehicle is controlled and/or regulated, taking into account the first sum of the known loss torques and also taking into account the second sum of the unknown loss torques of the drivetrain. In that way, assemblies of the motor vehicle can be operated particularly accurately and hence precisely.

The first operating condition of the motor vehicle, in which the second sum of the unknown loss torques of the drivetrain is determined currently, is fulfilled when the motor vehicle is at rest, i.e., at a standstill, and when the drive aggregate 1 is running at its idling rotation speed.

In particular, in the first operating condition, the transmission 3 is in neutral, or alternatively a gear is engaged in the transmission 3, namely, either a forward gear or a reversing gear, and then in the first operating condition the brake pedal 7 of the motor vehicle is preferably actuated.

The fulfillment of the above first operating condition can be detected with the help of measurement values, i.e., with the help of sensors.

For example, that the motor vehicle is at rest can be detected with the help of a rotation speed sensor on an output shaft of the transmission 3 or with the help of a rotation speed sensor on the drive output 2.

That the drive aggregate 1 is being operated at idling rotation speed can also be detected with the help of a sensor associated with a motor shaft. By way of the sensors associated with the transmission 3 it can be detected whether a gear is engaged in the transmission 3 or whether the transmission 3 is in neutral.

The actuation of the brake pedal 7 can also be detected with the help of a sensor.

If the first defined operating condition of the motor vehicle is fulfilled, then as already stated above the second sum, that of the unknown loss torques of the drivetrain, is currently determined, namely, on the basis of the current torque of the drive aggregate 1, on the basis of the current drag torque of the transmission 3, and on the basis of the empirically determined first sum of the known loss torques of the drivetrain stored in the control units.

The motor torque produced by the drive aggregate 1 when it is idling is known by the control system and can for example be determined on the basis of a motor characteristic diagram.

The drag torque of the transmission 3 is also known by the control system and can be determined as a function of temperature on the basis of a characteristic diagram. As a function of the transmission temperature the drag torque of the transmission 3 can be determined from a characteristic diagram of that type.

If the defined first operating condition of the motor vehicle is fulfilled, then the current second sum of the unknown loss torques of the drivetrain is determined as follows:

$$S_2 = M_{MOT} - M_{SCHLEPP} - S_1$$

in which $S_2$ is the current second sum of the unknown loss torques,
$S_1$ is the first sum of the known loss torques,
$M_{MOT}$ is the current motor torque,
$M_{SCHLEPP}$ is the current drag torque of the transmission.

If the defined first operating condition of the motor vehicle is no longer fulfilled, the most recently determined second sum of the unknown loss torques is stored and thereafter the operation of assemblies of the transmission is controlled and/or regulated taking account of the first sum of the known loss torques and taking into account the most recently determined and stored second sum of the unknown loss torques.

In particular, a starting process and/or a gear engagement in the transmission 3 and/or a gearshift in the transmission 3 is controlled and/or regulated on the basis of the second sum of the unknown loss torques determined in the above manner. Thus, preferably the functions of assemblies of the transmission are controlled and/or regulated on the basis of the second sum determined and stored, which are to be carried out immediately after the determination and storage of the second sum, namely, that of the unknown loss torques.

Preferably it is provided that when, after the determination and storage of the second sum of the unknown loss torques, a defined second operating condition of the motor vehicle is fulfilled, the second sum of unknown loss torques is reduced to a defined percentage and then the reduced second sum, in particular the defined percentage of the second sum, is used for controlling and/or regulating assemblies of the motor vehicle.

This defined percentage can be, for example, 70% or 50% or 30%, but the defined percentage can also be 0%.

The defined second operating condition of the motor vehicle, as a function of which the second sum of the unknown loss torques is preferably reduced to the defined percentage, is in particular fulfilled when a speed of the motor vehicle or an output rotation speed of the transmission 3 is higher than a first respective limit value, and/or when a time interval after the second sum of unknown loss torques has been determined is longer than a second limit value.

Thus, the second sum of the unknown loss torques is the more uncertain, the more time has lapsed since its determination. Accordingly, the second sum of the unknown loss torques is no longer maintained at 100% but preferably reduced to a defined percentage. This can even take place step-wise in such manner that after the lapse of a first interval the sum of unknown loss torques is first reduced to a first percentage, such as 70%, until the lapse of a second time interval which is longer than the first interval, after which the sum of unknown loss torques is reduced to a lower, second percentage such as 50%, or even to 0%.

Figure 2:
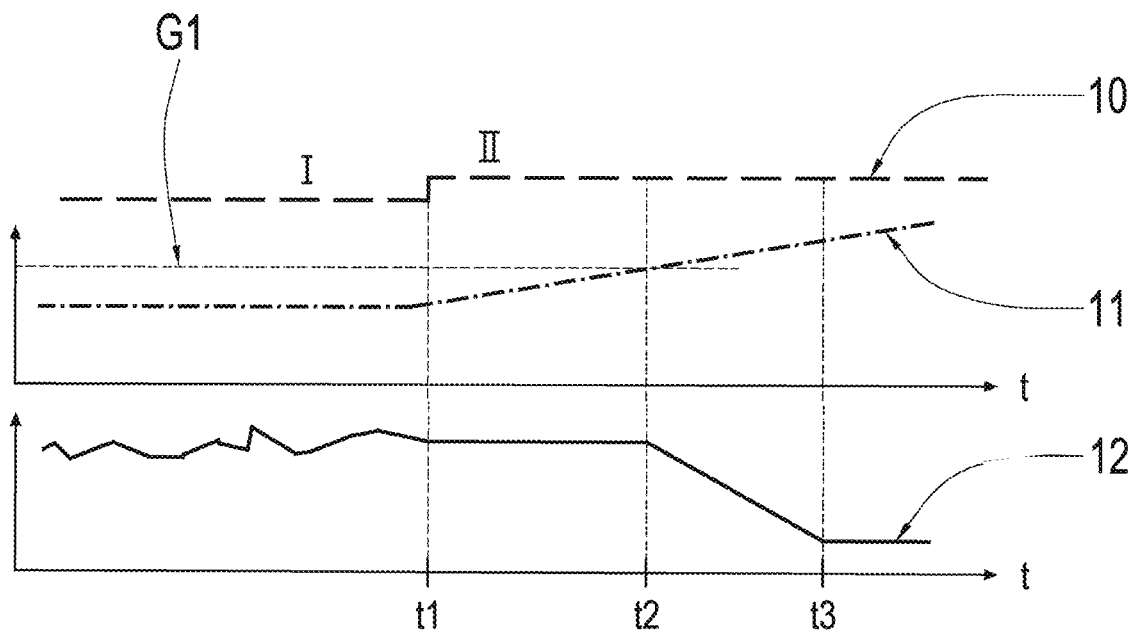
FIG. 2: A time diagram to make clear the method according to the invention for operating a motor vehicle.

For the further clarification of the invention FIG. 2 shows a time diagram in which, plotted against the time t, temporal curve forms 10, 11 and 12 are shown. The curve shape 10 corresponds to a status signal which indicates whether the first operating condition of the motor vehicle, required for the determination of the second sum of unknown loss torques, is or is not fulfilled. Condition I corresponds to a state in which the defined first operating condition is fulfilled. Condition II corresponds to a state in which the defined first operating condition is not fulfilled.

In FIG. 2, until time-point t1 the defined first operating condition of the motor vehicle is fulfilled, while before and up to time-point t1 the continual determination of the second sum of the unknown loss torques takes place in the manner described earlier. The shape of the curve 12 shows the time variation of the second sum of the unknown loss torques of the motor vehicle determined.

At time-point t1 the defined first operating condition of the motor vehicle is no longer fulfilled. The second sum of the unknown loss torques determined is stored at time-point t1.

Thereafter, beginning at time-point t1 or immediately after it, the stored second sum of the unknown loss torques is used for the subsequent operation of the motor vehicle, i.e., for the operation, namely the control and/or regulation, of assemblies of the motor vehicle. As stated above, a starting process and/or a gear engagement and/or a gearshift can be controlled and/or regulated on the basis of the second sum of the unknown loss torques determined.

As time-point t2 the second defined operating condition of the motor vehicle is fulfilled, so in FIG. 2 in accordance with the curve shape 11, which visualizes the rotation speed of the transmission's output, the rotation speed of the transmission's output becomes higher than a corresponding limit value G1. Accordingly, beginning at time-point t2 and until time-point t3 the second sum of the unknown loss torques determined and stored at time-point t1 is reduced, in particular to a defined percentage with a defined time gradient.

In FIG. 2, after time-point t3 the reduced second sum is maintained unchanged until the first operating condition of the motor vehicle is again fulfilled and after that the second sum of the unknown loss torques is determined again.

Other than this, it is also possible after time-point t3 and in particular when a defined time interval after time-point t1 or after time-point t3 has lapsed, to further reduce the second sum of the unknown loss torques determined. Thus, the second sum of the unknown loss torques determined can in particular be reduced to zero and then not any longer taken into account for the control and/or regulation of the operation of assemblies of the motor vehicle.

The invention also relates to a control unit, which is designed to carry out the method described above, automatically by control means. The control unit according to the invention is preferably an electronic control unit, in particular the transmission control unit 9. This has hardware means and software means for carrying out the method according to the invention. The hardware means include data interfaces in order to exchange data with the assemblies involved in carrying out the method according to the invention, such as sensors whose measurement values are evaluated in order to monitor the fulfillment of the defined first operating condition and the defined second operating condition. In addition, the hardware means include a processor for data processing and a memory for data storage. In the memory the second sum of unknown loss torques can be stored, as well as characteristic diagrams for determining the motor torque while idling and the temperature-dependant drag torque of the transmission 3. The software means include program modules implemented in the control unit in order to carry out the method according to the invention.

The control unit monitors the fulfillment of the defined first operating condition. If the control unit finds that the defined first operating condition is fulfilled, the control unit determines the second sum of the unknown loss torques of the drivetrain. This is determined as a function of the torque of the drive aggregate, as a function of the drag torque of the transmission 3 and as a function of the first sum of the known loss torques stored by the control system. Furthermore, thereafter the control unit uses the second sum of the unknown loss torques determined for the operation of assemblies of the motor vehicle, in order to control and/or regulate the operation of assemblies of the motor vehicle, taking into account the first sum of the known loss torques and also taking into account the second sum of the unknown loss torques.

The invention makes possible the highly accurate and therefore very precise control and/or regulation of assemblies of a drivetrain of a motor vehicle.

INDEXES

1 Drive aggregate
2 Drive output

3 Transmission
4 Clutch
5 Power take-off
6 Accelerator pedal
7 Brake pedal
8 Motor control unit
9 Transmission control unit
10 Status signal
11 Transmission output rotation speed
12 Second sum of the unknown loss torques

The invention claimed is:

1. A method for operating a drivetrain of a motor vehicle, comprising:
controlling operation of assemblies of the motor vehicle by taking into account a loss torque of the drivetrain;
fulfilling a defined first operating condition of the motor vehicle;
determining a second sum of unknown loss torques of the drive train as a function of a torque of a drive aggregate of the drivetrain, as a function of a drag torque of a transmission of the drivetrain, and as a function of a first sum of known loss torques of the drivetrain stored by the control system; and
controlling thereafter the operation of assemblies of the motor vehicle by taking into account a first sum of the known loss torques and taking into account the second sum of the unknown loss torques.

2. The method according to claim 1, wherein fulfilling the defined first operating condition of the motor vehicle comprises determining that the motor vehicle is at rest and determining that the drive aggregate is running at an idling rotation speed.

3. The method according to claim 2, wherein fulfilling the defined first operating condition of the motor vehicle further comprises actuating a brake pedal.

4. The method according to claim 2, wherein fulfilling the defined first operating condition of the motor vehicle further comprises determining that the transmission is in neutral or determining that a gear is engaged in the transmission.

5. The method according to claim 4, wherein fulfilling the defined first operating condition of the motor vehicle further comprises actuating a brake pedal.

6. The method according to claim 1, comprising:
determining that the defined first operating condition of the motor vehicle is no longer fulfilled; and
storing the second sum of the unknown loss torques.

7. The method according to claim 1, comprising:
controlling thereafter, the operation of assemblies of the motor vehicle by taking into account the first sum of the known loss torques and taking into account the second sum of the unknown loss torques during a starting process and/or during a gear engagement in the transmission and/or during a gearshift in the transmission.

8. The method according to claim 1, comprising:
fulfilling thereafter a defined second operating condition of the motor vehicle;
reducing the determined second sum of the unknown loss torques to provide a reduced second sum; and
controlling assemblies of the motor vehicle by taking into account the reduced second sum.

9. The method according to claim 8, wherein fulfilling the defined second operating condition of the motor vehicle comprises determining that a speed of the motor vehicle or an output rotation speed of the transmission is higher than a first limit value, and/or when a time interval after the determination of the second sum of the unknown loss torques is longer than a second limit value.

10. The method according to claim 1, comprising:
reducing to a defined percentage the determined second sum of the unknown loss torques.

11. The method according to claim 10, wherein reducing the determined second sum is performed according to a defined time gradient.

12. A control unit comprising:
control means configured to carry out the method of claim 1.

13. The control unit of claim 12, wherein the control unit is further configured to:
determine, when a defined first operating condition of the motor vehicle is fulfilled, a second sum of unknown loss torques of the drivetrain as a function of a torque of the drive aggregate, as a function of a drag torque of the transmission of the drivetrain, and as a function of a first sum of known loss torques of the drivetrain stored by the control system; and
control thereafter operation of assemblies of the motor vehicle taking into account the first sum of the known loss torques and taking into account the second sum of the unknown loss torques.

14. A control unit of a drivetrain of a motor vehicle, the control unit configured to:
determine, when a defined first operating condition of the motor vehicle is fulfilled, a second sum of unknown loss torques of the drivetrain as a function of a torque of the drive aggregate, as a function of a drag torque of the transmission of the drivetrain, and as a function of a first sum of known loss torques of the drivetrain stored by the control system; and
control thereafter operation of assemblies of the motor vehicle taking into account the first sum of the known loss torques and taking into account the second sum of the unknown loss torques.

* * * * *